W. F. COX.
APPARATUS FOR CLEANING, MOISTENING, AND COOLING AIR.
APPLICATION FILED MAR. 15, 1918. RENEWED SEPT. 6, 1919.
1,339,105.
Patented May 4, 1920.
3 SHEETS—SHEET 1.
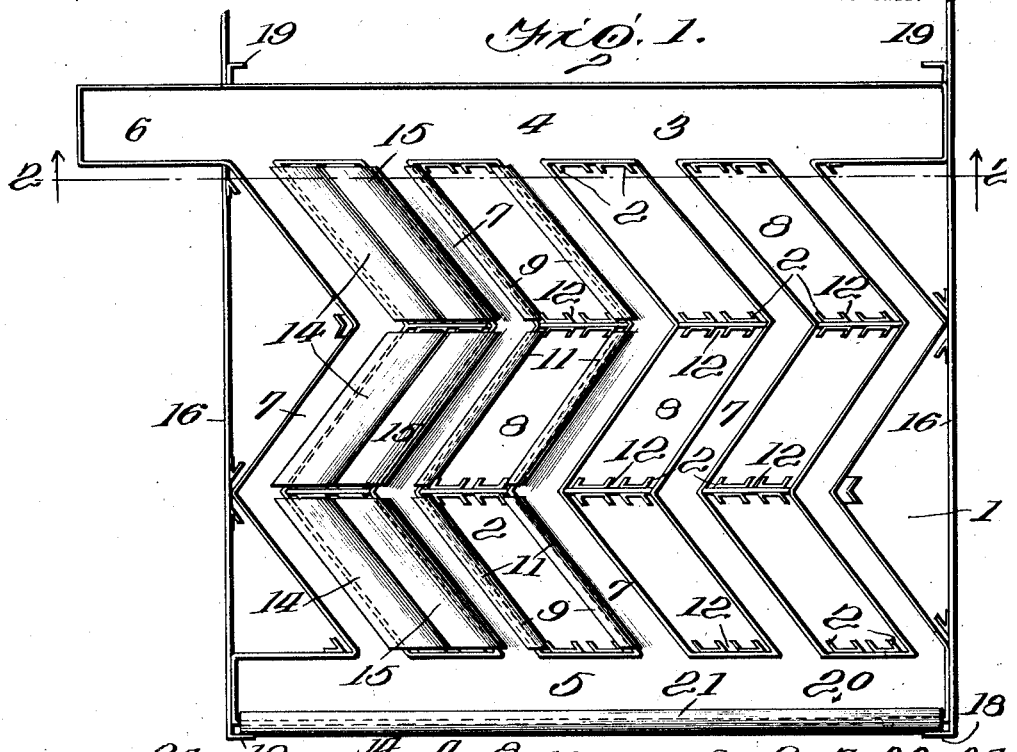
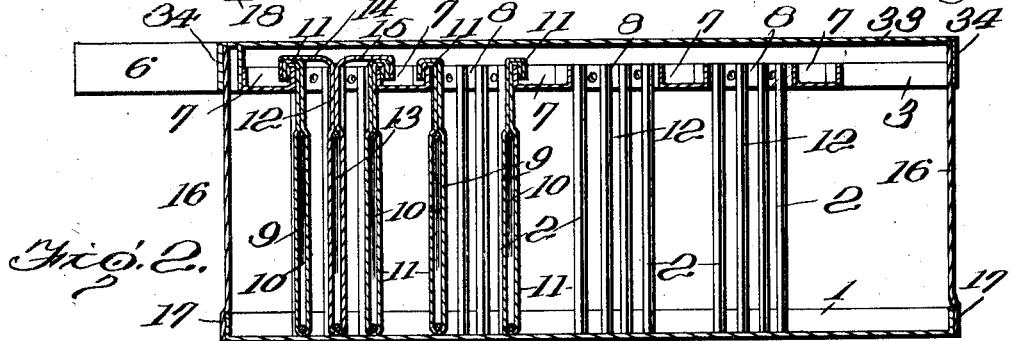
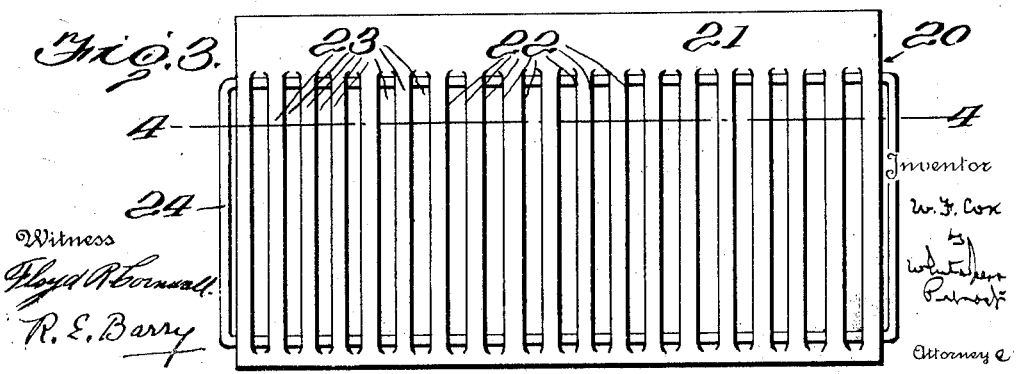

W. F. COX.
APPARATUS FOR CLEANING, MOISTENING, AND COOLING AIR.
APPLICATION FILED MAR. 15, 1918. RENEWED SEPT. 6, 1919.
1,339,105.
Patented May 4, 1920.
3 SHEETS—SHEET 2.
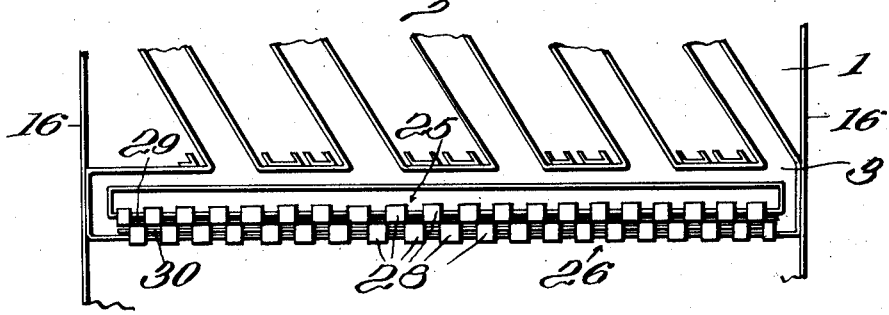
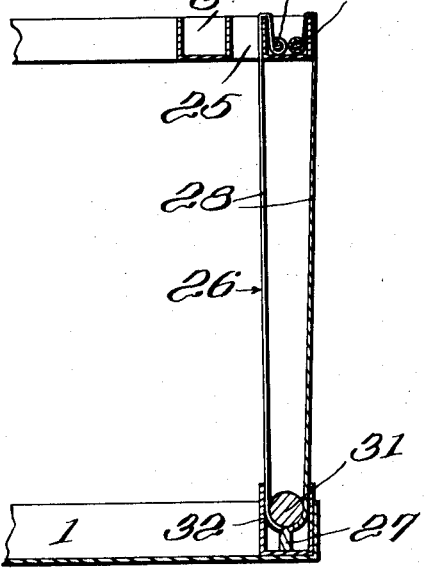
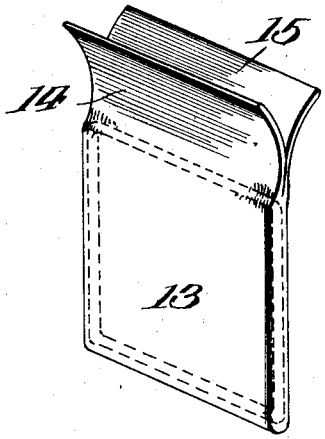

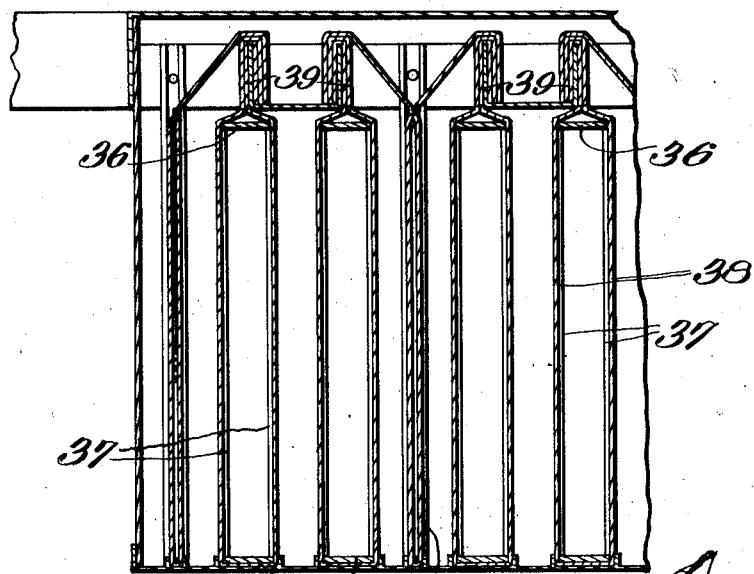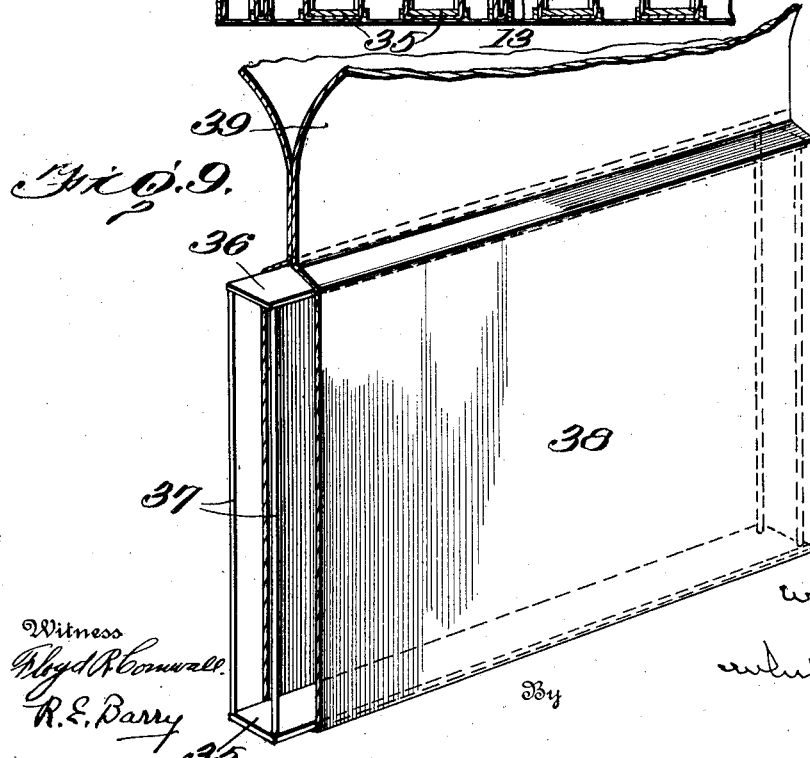

UNITED STATES PATENT OFFICE.

WILLIAM FRANKLIN COX, OF DANVILLE, VIRGINIA, ASSIGNOR TO SANITARY HEATING AND VENTILATING COMPANY, INCORPORATED, OF DANVILLE, VIRGINIA, A CORPORATION OF VIRGINIA.

APPARATUS FOR CLEANING, MOISTENING, AND COOLING AIR.

1,339,105.     Specification of Letters Patent.     Patented May 4, 1920.

Application filed March 15, 1918, Serial No. 222,686. Renewed September 6, 1919. Serial No. 322,230.

*To all whom it may concern:*

Be it known that I, WILLIAM F. Cox, citizen of the United States, residing at Danville, in the county of Pittsylvania and State of Virginia, have invented certain new and useful Improvements in Apparatus for Cleaning, Moistening, and Cooling Air; and I do hereby declare the following to be a full, clear, and exact description of the invention, such as will enable others skilled in the art to which it appertains to make and use the same.

This invention relates to devices for cleaning, moistening and cooling air and comprises certain improvements in the air cleaning, moistening and cooling apparatus shown and described in my Letters Patent No. 1,233,555 dated July 17, 1917.

One of the objects of my invention is to provide an air cleaning, moistening and cooling apparatus which will increase the extent of cleaning and cooling surfaces, without enlarging the casing, water pan or drip pan of my former apparatus and this I accomplish by slightly altering the latter. One of my improvements resides in placing intermediate baffles in the spaces between the baffles of my patented device and providing these intermediate baffles with double wicks, one of which rests in the pan on one side of the intermediate baffle and the other of which rests in the pan on the opposite side of the intermediate baffle. These wicks also close the spaces between the zigzag portions of the pan and prevent the air circulating through and above the pan.

A further object of this invention is to substitute, if desired, double baffles for the single baffles of my patented apparatus, so that a greater number of air cleaning, cooling and moistening surfaces will be provided without increasing the size of the apparatus.

A further feature of my invention consists in improved forms of ribbon screens, which have alternate ribbons spaced away from one another, longitudinally of the apparatus, so that a space is provided between every other ribbon, while the ribbons between are arranged in alinement with the spaces. These forms of ribbon screens cause the air to travel in a zigzag course in its passage through the ribbon screens and consequently contact with a large extent of cleaning, moistening and cooling surface.

With the foregoing objects outlined and with other objects in view, it will be apparent as the nature of my improvements is better understood, that the present invention resides in the combination and arrangement of parts, and in the details hereinafter described and claimed, and shown in the accompanying drawings. It will be understood that changes in the precise embodiments of the invention herein disclosed may be made within the scope of what is claimed and without departing from the spirit of the invention or sacrificing any of its advantages.

Referring to the drawings;

Figure 1 is a top plan view of my improved apparatus, with the cover and certain baffles removed for the purpose of clearness.

Fig. 2 is a vertical transverse sectional view taken on line 2—2 of Fig. 1, and showing the cover attached.

Fig. 3 is a front view of my preferred form of ribbon screen and its supporting frame.

Fig. 4 is a horizontal transverse sectional view taken on line 4—4 of Fig. 3.

Fig. 5 is a top plan view of a portion of a modified form of water pan used in connection with a modified form of ribbon screen.

Fig. 6 is a detail showing a vertical section of a portion of the modified water pan and drip pan and the modified form of ribbon screen.

Fig. 7 is a perspective view of one of my improved double wick absorbent baffles.

Fig. 8 is a detail of a modification showing the use of double baffles instead of single ones.

Fig. 9 is a perspective view, partly in section, of one of the double baffles.

My improved air cleaner, moistener and cooler comprises a drip pan 1, provided with vertically extending guides 2, which are arranged in staggered relation and form supports for a liquid pan 3. The liquid pan 3 consists of opposite end portions 4 and 5, one of which communicates with an extension 6 employed to supply the pan with liquid as disclosed in my prior patent. The end portions 4 and 5 are connected together by staggered or zigzag troughs 7 having staggered openings 8, located between them. Baffles 9, each of which consists of a frame 10 inserted in a bag or sack 11, formed of suitable absorbent material, are inserted from the top of the water pan into the guides 2 and the upper ends 11 of the sacks are adapted to be folded over into the staggered troughs 7 of the liquid pan 3 and act as wicks which, by capillary attraction, draw liquid from the pan 3, said liquid then descending the baffles 9 by gravity. The foregoing is also a description of my patented apparatus, which I have improved in the following manner.

Located between the guides 2 and arranged in staggered relation, are intermediate guides 12, in which are removably located, intermediate baffles 13, which are similar in construction to the baffles 9 with the exception that the upper ends of the sack have two wicks 14 and 15 which are separated from each other and folded over into adjacent troughs 7 of the liquid pan 3, as clearly shown in Figs. 1 and 2. These intermediate baffles greatly increase the amount of cleaning, moistening and cooling surface in the apparatus without enlarging the same and their wicks prevent air from passing upwardly into contact with the liquid in the liquid pan 3. By providing the intermediate baffles, my apparatus will be more efficient in operation and will insure perfect cleaning, moistening and cooling of the passing air. It will be understood that the liquid in the liquid pan 3 will constantly maintain the baffles in moist condition and impurities in the air passing through the staggered passages, formed by the baffles, will be lodged on the surface of the latter, and it will be obvious that the air leaving the apparatus will be cooler than when entering.

Instead of using the single baffles 9, I may increase the amount of cleaning, moistening and cooling surfaces by employing double baffles, such as shown in Figs. 8 and 9. In this instance, each of the double baffles consists of a bottom plate 35, top plate 36, rods 37 connecting the plates, and a strip of cloth 38 which is passed around the frame formed by the plates and rods and is provided at its upper end with a wick 39 adapted to rest in the waterpan. The double baffles rest partly beneath the troughs 7 and partly beneath the opening between the troughs. As the ends of the double baffles are open, it will be seen that the air can pass through the same and that the cleaning, moistening and cooling surface will be thereby increased.

16 represents the sides of the apparatus which are flanged at their lower ends, as shown at 17, to snugly embrace the drip pan 1. The front ends of the sides are bent inwardly as shown at 18, and the rear ends are provided with angle irons 19, to form guides for the frames of one form of my improved ribbon screens, which will now be described.

The ribbon screen shown in Figs. 1, 3 and 4 consists of a sheet of absorbent material 20 having a solid upper portion forming a wick 21, which is folded over into the liquid pan 3, for the purpose of drawing liquid from the pan and feeding it down the screen. The screen is slit vertically, as shown at 22, to provide a series of ribbons 23. A rectangular frame 24 is inserted through said slits in such manner that alternate ribbons 23 are arranged in opposite sides of the frame, the ribbons on one side of the frame being spaced apart and the ribbons on the opposite side of the frame being arranged in alinement with said spaces. The purpose of this will be apparent by viewing Fig. 4, which shows the ribbons forming staggered passages to cause the air, indicated by arrows, to travel in a tortuous path, so that contact with the moistened ribbons is insured.

When it is desired to remove the baffles or screens for the purpose of cleaning or renewing the same, they can be lifted out of their guides and removed from their supporting frames.

In Figs. 5 and 6, I have illustrated a slightly modified form of liquid pan and ribbon screen, in which each of the end portions (only one of which is shown) of the pan 3 is provided with a transverse opening 25. The ribbon screen in this instance consists of a sheet of absorbent material 26 having a solid lower end 27. The sheet is slit vertically to provide ribbons 28 and alternate ribbons are connected together at their upper ends by rods 29 and 30 which rest in the liquid pan 3. It will be seen from Fig. 6, that the opening 25 is provided in the liquid pan to permit the upper ends of the ribbons connected to the rod 29, to be placed in the liquid pan. A rod 31 is passed through the lower end of the screen to maintain alternate ribbons in spaced relation in a manner similar to that shown in Fig. 4, and this rod rests in a guide 32 provided on the drip pan 1. With this construction liquid is supplied directly to the upper ends of the ribbons and feeds downwardly by gravity, and as the spaces between alternate ribbons are arranged in alinement with the intermediate ribbons, the air will be caused to pass through staggered passages in a manner which will be apparent.

A cover 33 having a depending flange 34 is removably secured to the upper end of the apparatus and when it is desired to remove a baffle or screen, this top is removed and the baffle or screen is drawn out.

What I claim and desire to secure by Letters Patent is:—

1. An apparatus for cleaning, moistening and cooling air, comprising a liquid containing receptacle provided with openings, a series of baffles arranged beneath said receptacle, having wicks passing through said openings and resting in said receptacle for drawing liquid from the same, and intermediate baffles arranged between adjacent rows of said baffles and provided with double wicks which rest in said liquid receptacle and close said openings.

2. An apparatus for cleaning, moistening and cooling air, comprising a liquid receptacle provided with staggered troughs and openings between the troughs, a series of absorbent baffles arranged in staggered relation beneath said pan to form staggered passages for the air, wicks provided on said baffles passing through the openings and resting in the liquid receptacle for drawing liquid from the same, and intermediate baffles located between said baffles and provided with double wicks which rest in adjacent troughs and close the openings between the troughs.

3. An air cleaning, moistening and cooling apparatus comprising a liquid receptacle provided with troughs and openings between the same, and baffles located beneath said receptacle to form passages and provided with double wicks which rest in adjacent troughs and close said openings.

4. An air cleaning, moistening and cooling apparatus comprising a liquid receptacle provided with staggered troughs and openings between the same, and baffles arranged beneath said receptacle to form staggered passages and provided with double wicks which rest in adjacent troughs and close said openings.

5. An air cleaning, moistening and cooling apparatus comprising a liquid receptacle, a series of staggered guides located beneath said receptacle, a series of baffles arranged in said guides and provided with wicks which rest in said receptacle for drawing liquid from the same, and intermediate baffles arranged between said baffles and provided with double wicks which rest in said receptacle.

6. An air cleaning, moistening and cooling apparatus comprising a liquid receptacle provided with staggered troughs and openings between the same, guides arranged beneath said receptacle, a series of absorbent baffles arranged in said guides and provided with wicks which rest in said receptacle for drawing liquid from the same, intermediate guides arranged between the other guides and beneath said openings, and intermediate absorbent baffles removably supported by the intermediate guides and having double wicks which rest in adjacent troughs and close the openings between the same.

7. An air cleaning, moistening and cooling apparatus comprising a liquid receptacle provided with staggered troughs and openings between the same, guides arranged beneath said receptacle, a series of absorbent baffles arranged in said guides and provided with wicks which rest in said receptacle for drawing liquid from the same, intermediate guides arranged between the other guides and beneath said openings, intermediate absorbent baffles removably supported by the intermediate guides and having double wicks which rest in adjacent troughs and close the openings between the same, and screens located at the ends of said receptacle.

8. In an apparatus for cleaning, moistening and cooling air, the combination with a liquid containing receptacle, of a series of baffles, each of which comprise a frame covered with a sack formed of absorbent material having its upper end divided to form two wicks which rest in said receptacle for drawing liquid from the same.

9. In an apparatus for cleaning, moistening and cooling air, the combination with a liquid containing receptacle, of a ribbon screen comprising a wick resting in said receptacle and provided with a series of ribbons, and means for holding adjacent ribbons in spaced relation, to form staggered passages in the screen.

10. In an apparatus for cleaning, moistening and cooling air, the combination with a liquid containing receptacle, of a ribbon screen comprising a wick resting in said receptacle and provided with a series of ribbons, and a frame for holding adjacent ribbons in spaced relation to form staggered passages in the screen.

11. In an apparatus for cleaning, moistening and cooling air, a liquid receptacle, a sheet of absorbent material having a solid upper end forming a wick which rests in said receptacle for drawing liquid from the same, said sheet being slit to form a series of ribbons, and a frame inserted through said slits in such manner that the ribbons on one side of the frame are in alinement with the spaces formed between alternate ribbons on the opposite side of the frame.

12. An apparatus for cleaning, moistening and cooling air, comprising a liquid containing means including troughs with openings between the same, and baffles located beneath said liquid containing means to form passages and provided with double wicks which rest in adjacent troughs and close said openings.

13. An apparatus for cleaning, moistening and cooling air, comprising liquid containing means including troughs with openings between the same, a series of baffles arranged beneath said liquid containing means and having wicks passing through said openings and resting in said troughs for drawing liquid from the same, and intermediate baffles arranged between adjacent rows of said baffles and provided with double wicks which rest in said troughs and close said openings.

14. An apparatus for cleaning, moistening and cooling air, comprising liquid containing means including troughs with openings between the same, a series of double open ended baffles arranged beneath said liquid containing means and having wicks passing through said openings and resting in the troughs for drawing liquid from the same, and intermediate baffles arranged between adjacent rows of said baffles and provided with double wicks which rest in said troughs and close said openings.

In testimony whereof I affix my signature.

WILLIAM FRANKLIN COX.